(12) United States Patent
Lin et al.

(10) Patent No.: US 11,004,317 B2
(45) Date of Patent: May 11, 2021

(54) MOVING DEVICES AND CONTROLLING METHODS, REMOTE CONTROLLING SYSTEMS AND COMPUTER PRODUCTS THEREOF

(71) Applicant: GIGA-BYTE TECHNOLOGY CO.,LTD., New Taipei (TW)

(72) Inventors: Shih-Yuan Lin, New Taipei (TW); Kuang-Hua Pai, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 26 days.

(21) Appl. No.: 16/234,228

(22) Filed: Dec. 27, 2018

(65) Prior Publication Data
US 2019/0206211 A1 Jul. 4, 2019

(30) Foreign Application Priority Data
Dec. 29, 2017 (TW) .................. 106146482

(51) Int. Cl.
*G08B 13/196* (2006.01)
*H04L 12/28* (2006.01)
(Continued)

(52) U.S. Cl.
CPC ... *G08B 13/19621* (2013.01); *G06K 9/00288* (2013.01); *G06T 7/75* (2017.01);
(Continued)

(58) Field of Classification Search
CPC .................. G06T 7/75; G06K 9/00288; G08B 13/19684; G08B 13/19654; G08B 13/19656; G08B 13/19691; G08C 2201/42
See application file for complete search history.

(56) References Cited

U.S. PATENT DOCUMENTS

2007/0008918 A1* 1/2007 Stanforth .............. H04W 40/38
370/328
2015/0061879 A1* 3/2015 Sone ..................... G05B 15/02
340/635

(Continued)

FOREIGN PATENT DOCUMENTS

| CN | 1771113 A | 5/2006 |
| CN | 206147320 U | 5/2017 |

(Continued)

*Primary Examiner* — Jeremiah C Hallenbeck-Huber
(74) *Attorney, Agent, or Firm* — Birch, Stewart, Kolasch & Birch LLP

(57) ABSTRACT

A moving device which can move autonomously in an environment is provided and includes an image capturing component, a processor, a moving component, and a signal transmitter. The image capturing component captures environmental feature information of the environment during moving process of the moving device. The processor identifies a first location of at least one electronic apparatus in the environment according to the environmental feature information and predetermined feature information corresponding to the at least one electronic apparatus and determines a second location corresponding to the first location according to a remote signal. The moving component causes the moving device to move to the second location. The signal transmitter controlled by the processor. The signal transmitter sends a first signal from the second location to the at least one electronic apparatus to control the operation of the at least one electronic apparatus.

11 Claims, 6 Drawing Sheets

(51) Int. Cl.
*G08C 17/02* (2006.01)
*G06T 7/73* (2017.01)
*G06T 17/10* (2006.01)
*G08B 21/14* (2006.01)
*G06K 9/00* (2006.01)

(52) U.S. Cl.
CPC ........ *G06T 17/10* (2013.01); *G08B 13/19689* (2013.01); *G08B 21/14* (2013.01); *G08C 17/02* (2013.01); *H04L 12/282* (2013.01); *G08C 2201/42* (2013.01); *G08C 2201/91* (2013.01); *G08C 2201/92* (2013.01); *G08C 2201/93* (2013.01); *H04L 2012/285* (2013.01)

(56) References Cited

U.S. PATENT DOCUMENTS

| | | | | |
|---|---|---|---|---|
| 2015/0197015 A1* | 7/2015 | Lee | ........................ | B25J 9/1689 |
| | | | | 700/259 |
| 2017/0025736 A1* | 1/2017 | McAllister | ............... | H01Q 3/02 |
| 2017/0225336 A1* | 8/2017 | Deyle | ..................... | G06K 19/14 |
| 2017/0361468 A1* | 12/2017 | Cheuvront | ............ | A47L 9/2805 |
| 2018/0321687 A1* | 11/2018 | Chambers | ............ | G05D 1/0274 |
| 2019/0159044 A1* | 5/2019 | Abou-Rizk | ............. | H04L 43/08 |
| 2019/0183310 A1* | 6/2019 | Herron | .................. | A47L 9/2805 |

FOREIGN PATENT DOCUMENTS

| CN | 206421563 U | 8/2017 |
|---|---|---|
| TW | M472277 U | 2/2014 |
| TW | M483510 U | 8/2014 |
| TW | 201607253 A | 2/2016 |
| TW | I539824 B | 6/2016 |

\* cited by examiner

MOVING DEVICES AND CONTROLLING METHODS, REMOTE CONTROLLING SYSTEMS AND COMPUTER PRODUCTS THEREOF

CROSS REFERENCE TO RELATED APPLICATIONS

This application claims the benefit of Taiwan Patent Application No. 106146482, filed on Dec. 29, 2017, the entirety of which is/are incorporated by reference herein.

BACKGROUND OF THE INVENTION

Field of the Invention

The invention relates to a moving device and a controlling method thereof, and more particularly to a moving device, which can be used for controlling an electronic apparatus in an environment, and a controlling method thereof, a remote controlling system, and a computer program product.

Description of the Related Art

In recent years, with the rapid development of technology, many moving devices with autonomous mobility (such as cleaning robots) and smart home appliances are becoming more and more popular. For example, housewives can use some robots with automatic cleaning functions, such as cleaning robots, to perform automatic cleaning of the floor. A cleaning robot can automatically walk on the floor after setting and perform automatic cleaning operations, such as floor cleaning, by its cleaning module, which makes home cleaning easier. On the other hand, housewives can also operate various functions of smart home appliances to assist in various family works.

However, general cleaning robots usually cannot interact with other smart home appliances and do not have the function of detecting other conditions in the environment, for example, they cannot detect whether there is smoke and excessive carbon monoxide in the environment, and they cannot detect if someone other than family members have invaded the rooms. In addition, the current smart home appliances must be placed in locations with a limited distance and orientation so that they can send signals to a remote controlling device. If there are many remote controlling needs in multiple places such as a living room, a bedroom, a kitchen, etc., it is necessary to buy multiple remote controlling devices to control these home appliances, which causes inconvenience in use.

BRIEF SUMMARY OF THE INVENTION

The invention provides to a moving device and a controlling method thereof and a remote controlling system.

An embodiment of the present invention provides a moving device which can move autonomously in an environment where at least one electronic apparatus is located. The moving device comprises an image capturing component, a processor, a moving component, a storage device, and a signal transmitter. The image capturing component captures environmental feature information of the environment during moving process of the moving device. The processor is electrically connected to the image capturing component. The processor identifies a first location of the at least one electronic apparatus in the environment according to the environmental feature information and predetermined feature information corresponding to the at least one electronic apparatus and determines a second location corresponding to the first location according to a remote signal. The moving component is controlled by the processor. The moving component causes the moving device to move to the second location. The signal transmitter controlled by the processor. The signal transmitter sends a first signal from the second location to the at least one electronic apparatus to control the operation of the at least one electronic apparatus.

Another embodiment of the present invention provides a controlling method for controlling the above moving device.

Another embodiment of the present invention provides a remote controlling system performing a remote controlling operation in an environment. The remote controlling system comprises a first electronic apparatus, the above moving device, and a remote controlling device. The first electronic apparatus is disposed in a first location in the environment. The moving device autonomously moves in the environment. The remote controlling device is coupled to the moving device via a network. The remote controlling device generates the remote signal corresponding to the first electronic apparatus and transmits the remote signal to the moving device via the network.

Another embodiment of the present invention provides a computer-readable storage media. The computer-readable storage media comprises a stored computer program. The above controlling method is performed when an apparatus executes the stored computer program.

With regard to other additional features and advantages of the present invention, those skilled in the art can make some modifications to the moving device and related controlling methods disclosed in the method of the present invention without departing from the spirit and scope of the present invention. Changed and retouched.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The above and other objects, features, and advantages of the present invention will become more apparent from the description of the appended claims. It is to be understood that the present invention is described in the preferred embodiments of the present invention, and is intended to illustrate the scope of the present invention, and is not intended to limit the scope of the present invention. It should be understood that the following embodiments may be via software, hardware, and firmware. Or in any combination of the above.

An embodiment of the present invention provides a moving device, a controlling method thereof, and a remote controlling system of the present invention, which can establish a three-dimensional model of an indoor environment by using image capturing and machine vision capability of the moving device in the indoor environment, automatically detect or manually set the locations of electronic apparatuses that can be remotely controlled in the environment, such as smart home appliances, through machine learning, and send the corresponding control signals to remotely control the electronic apparatuses that need to be activated, thereby effectively combining the mobility of the moving device and the remote controlling capabilities of the smart home appliances and establishing a smart home environment with the least amount of equipment.

Figure 1:
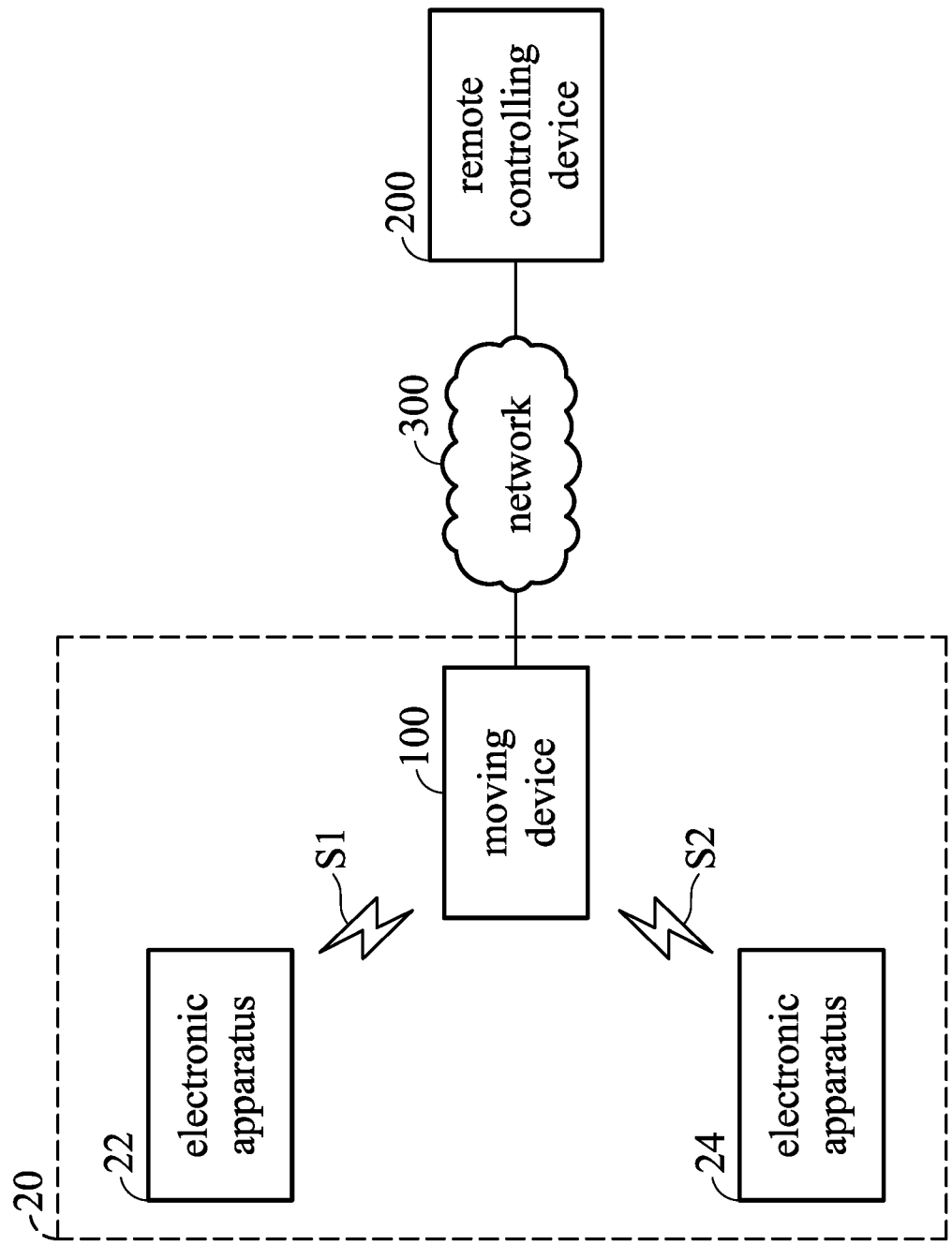
FIG. 1 is a schematic diagram showing a remote controlling system according to an embodiment of the present invention.

FIG. 1 is a schematic diagram showing a remote controlling system according to an embodiment of the present invention. As shown in FIG. 1, the remote controlling system 10 comprises one or more electronic apparatuses 22 and 24, a moving device 100, and a remote controlling device 200, wherein the moving device 100 can communicate with the remote controlling device 200 via a connected network 300 (for example, any wired or wireless communication network, such as the Internet, 3G network, and/or wireless local area network (WLAN), etc.). The moving device 100 can receive signals from the currently connected network 300, transmit signals to the currently connected network 300, and allow communication with one or more additional devices, computers, and/or servers using a wireless network. The remote controlling device 200 can receive signals from the currently connected network 300, and transmit signals to the currently connected network 300, and allow communication with one or more additional devices, computers, and/or servers using a wireless network. For example, the moving device 100 can receive a remote signal, which is used to activate the electronic apparatus 22, from the remote controlling device 200 through the currently connected network 300 and transmit a warning signal to the remote controlling device 200 through the network 300. Similarly, the remote controlling device 200 can receive various signals from the moving device 100 through the network 300 and transmit remote signals to the moving device 100 through the network 300. The remote controlling device 200 can be a remote computer and/or server located at the other end of the network 300, a portable device, or a handheld device, such as a digital personal assistant (PDA), a smart phone, a tablet, a mobile phone, a mobile Internet device (MID), a laptop, a car computer, a digital camera, a digital media player, a gaming device or any type of mobile computing device, however, those skilled in the art can understand that the invention is not limited thereto. The remote controlling device 200 can support various communication protocols such as a code division multiple access system (CDMA), a global mobile communication system (GSM), an enhanced data GSM environment (EDGE), a high-speed downlink packet access (HSDPA), Wi-Fi (e.g. IEEE 802.11a/b/g/n), Bluetooth and Wi-MAX communication protocols, and protocols for e-mail, instant messaging (IM), and smart information services (SMS), but the invention is not limited thereto.

The one or more electronic apparatuses 22 and 24 are disposed at fixed locations in the environment 20 respectively. For example, the electronic apparatus 22 and 24 may be home appliances having smart home appliance functions, such as a television, an air conditioner, a refrigerator, an air cleaner, or any other device having a remote controlling function, but the present invention is not limited thereto. The electronic apparatuses 22 and 24 are disposed at the fixed locations in the environment 20 (for example, any indoor space such as a living room, a bedroom, or a restaurant) and can be controlled by corresponding control signal S1 and S2 respectively to operate corresponding operations. The moving device 100 can move autonomously in the environment 20 and can transmit the control signals S1 and S2 to control the operations of the electronic apparatuses 22 and 24, respectively, and the relevant content of which will be described in the following. The control signal S1 is a control signal corresponding to the electronic apparatus 22, and the control signal S2 is a control signal corresponding to the electronic apparatus 24. The control signals S1 and S2 may be radio frequency (RF) control signals or infrared (IR) control signals, but the invention is not limited thereto. For example, in an embodiment, the electronic apparatus 22 can be an electrical device (such as a television) disposed at a first location in the living room and can be controlled by an infrared control signal to start or stopped operating; and the electronic apparatus 24 can be another home appliance (such as an air conditioner) that can be placed in a second location in the living room or other space and can be controlled by a radio frequency control signal to start or stop operating. The moving device 100 can be any moving device with autonomous moving capability and navigation functions, such as a cleaning robot or another robot which can move freely or move to any location in the environment 20 according to a predetermined route, and further can return to a charging station (not shown) to park or being charged when the task is completed or the power is insufficient.

Figure 2:
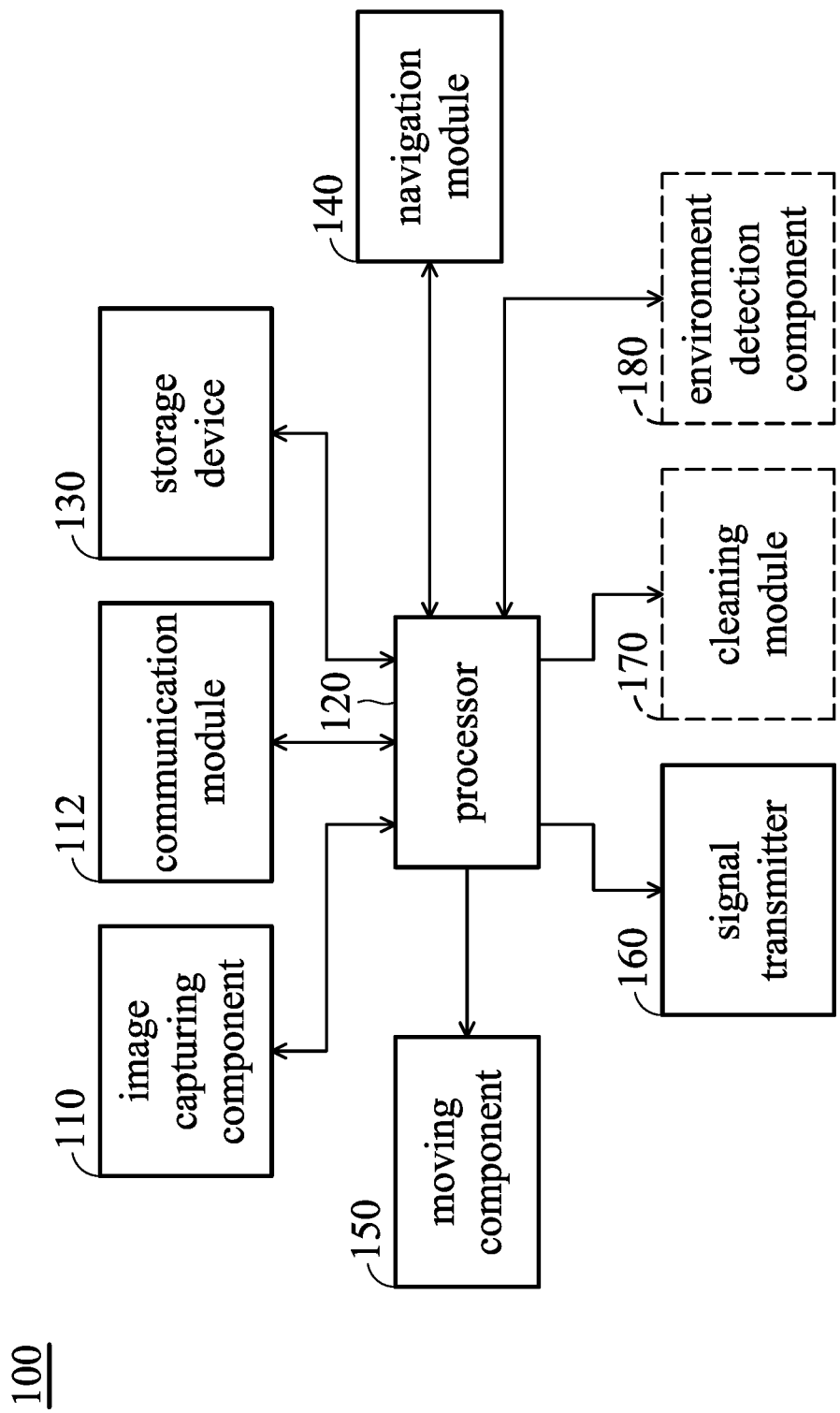
FIG. 2 is a schematic diagram showing a moving device according to an embodiment of the present invention.

FIG. 2 is a schematic diagram showing a moving device 100 according to an embodiment of the invention. Referring to FIGS. 1 and 2, the moving device 100 comprises an image capturing component 110, a communication module 112, a processor 120, a storage device 130, a navigation module 140, a moving component 150, and a signal transmitter 160. The image capturing component 110 can be any sensor or image capturing device that can be used to capture images and detect relative distances and orientations between the moving device and objects (such as the home appliances 22 and 24 or other obstacles) in the environment 20 where the moving device 100 is located, such as a depth-of-field camera (such as a time-of-flight (TOF) camera), a lidar, an image sensor, an ultrasound sensor, a laser sensor, or a combination of the foregoing various elements, but the invention is not limited thereto.

In an embodiment, the image capturing component 110 can be disposed above the moving device 100, and the image capturing component 110 can rotate by 360 degrees to scan objects in the surrounding environment of the moving device 100 and the distributions of these objects, obtain feature information of the objects, and establish a three-dimensional model of the environment 20, but the invention is not limited thereto. For example, taking the image capturing component 110 as a lidar, the moving device 100 can scan the surrounding environment through transmitting one or more laser beams by the lidar, receive and analyze the reflection signals from the objects, and measure the flight time of the optical pulses. Accordingly, the relative distances and the orientation angles between the moving device 100 and the objects are determined to confirm whether there is an object around the moving device 100, and feature information of the objects is generated according to the relative distances and orientation between the moving device 100 and the objects. The feature information of the objects may be used to indicate the features of the appearance of the objects and is generated according to the reflection signals when the image capturing component 110 scans the objects. Specifically, each of the above objects is a three-dimensional object in the environment, and the image capturing component 110 emits a signal (for example, laser light, etc.) to scan the objects by a certain angle. When the image capturing component 110 emits a signal (for example, laser light, etc.) to scan the surrounding environment and the scanning signal contacts the surface of an object, the sensor 110 can receive some reflection signals at different angles and distances according to the appearance of the object. Therefore, the image capturing component 110 can generate feature information indicating the appearance feature of the object according to a relative angle and distance information of the received reflection signals.

In some embodiments, the mobile device 100 may also comprise a sensor (not shown) for detecting the orientation information of the moving device 100 which is capable of providing the traveling orientation information of the moving device 100 and also assisting the moving device 100 in identifying a steering angle or the like when the moving device 100 steers, for example, an electronic compass, a gyroscope, or other inertial measurement device, but the present invention is not limited thereto.

The communication module 112 can receive signals from the currently connected network 300 and transmit signals to the currently connected network 300. The communication module 112 may comprise a wireless module that can be coupled to one or more antennas (not shown) and communicate with the remote controlling device 200 using a wireless network. The moving device 100 can support various communication protocols such as communication protocols such as Wi-Fi (for example, IEEE 802.11a/b/g/n), Bluetooth, and Wi-MAX, but the present invention is not limited thereto.

The storage device 130 can be a non-volatile storage medium (such as, a read-only memory (ROM), a flash memory, a hard disk, a CD, etc.), a volatile storage medium (for example, a random access memory (RAM), or any combination of the foregoing two for storing related data, such as intermediate data of the operation process and execution result data. The storage device 130 can also be used to store instruction sets and/or code program modules executable by the processor 120. Generally, a program module comprises a routine, a program, an object, a component, and the like. The storage device 130 can further store various data required for the operations, such as map information, sensor information, or a plurality of predetermined shape feature information about the electronic apparatuses 22 and 24. The storage device 130 may further comprise a to-be-matched database (not shown), and the database stores the predetermined feature information and/or the relative locations of the electronic apparatuses 22 and 24 in the environment 20 and also stores the types of control signals. In the embodiment, the predetermined shape feature information of an electronic apparatus indicates the information related to the 3-dimensional appearance feature of the electronic apparatus which is detected when the sensor 110 of the moving device 100 performs feature detection on the electronic apparatus.

The processor 120 is coupled to the image capturing component 110, the communication module 112, the storage device 130, the navigation module 140, the moving component 150, and the signal transmitter 160. The processor 120 can load instruction sets and/or codes from the storage device 130 and execute the loaded instruction sets and/or codes to control the operations of the image capture component 110, the communication module 112, the storage device 130, the navigation module 140, the moving component 150, and the signal transmitter 160 to perform the controlling method of the present invention. The relevant details will be described in the following paragraphs. The processor 120 can be a general-purpose processor, a central processing unit (CPU), a microprocessor (micro-control unit (MCU), a graphics processing unit (GPU), or a digital signal processor (DSP) for providing data analysis, processing and calculation functions.

The navigation module 140 can perform a path planning according to the current location of the moving device 100 and a destination, thereby obtaining a planning path. The processor 120 can control the navigation module 140 to perform a navigation operation, so that the moving device 100 can move to the destination along the planning path. In some embodiments, the navigation module 140 may further comprise a global planner (not shown) and a local planner (not shown) which are used for generating a planning path to the destination. Based on the planning path, the navigation module 140 can perform an obstacle avoidance operation for the navigation. The global planner is responsible for planning the best global path from the current location of the moving device 100 to a designated location. The local planner is responsible for planning a best local path and performing a dynamic obstacle avoidance operation according to the surrounding information of the real environment where the moving device 100 is located and the global path provided by the global planner. Finally, the processor 120 controls the moving component 150 to drive the moving device 100 to start moving to the designated location according to the planned path.

The moving element 150 can be a roller, a track, or the like. The moving device 100 can move in the environment 20 by using the moving component 150. The processor 120 can control the traveling route of the moving device 100 by controlling the moving component 150 and, thus, the moving device 100 can move to any location in the environment 20 through the moving component 150. In an embodiment, the processor 120 controls the rotational speed and/or the veering direction of the roller of the moving component 150, thereby controlling the traveling path of the moving device 100.

The signal transmitter 160 may send corresponding control signals to the electronic apparatuses 22 and 24 to remotely control the electronic apparatuses 22 and 24. For example, the signal transmitter 160 may send IR signals or RF signals to control the electronic apparatuses 22 and 24 to be activated or inactivated or to perform other functions, but the invention is not limited thereto. The processor 120 is configured to control the signal transmitter 160 to send corresponding control signals according to the signal types corresponding to the electronic apparatuses 22 and 24.

It can be understood that each of the above components or modules is a device having a corresponding function and may have appropriate hardware circuits or components to perform corresponding function. However, the device is not limited to an entity. It may be a virtual program or software with the corresponding function, or a device with the ability to process and operate the program or software. The operation of each element can be referred to the description of the corresponding method below.

Figure 3:
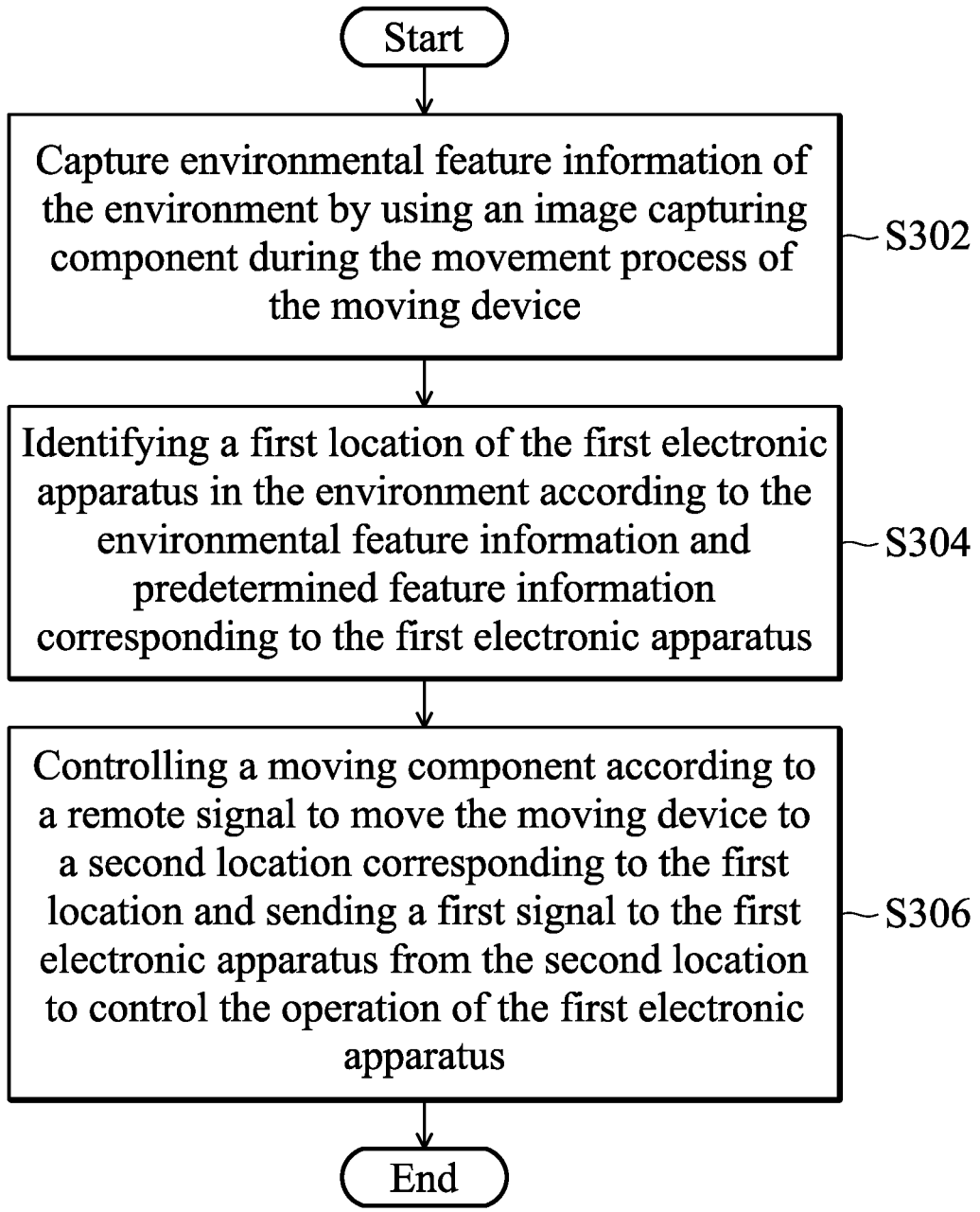
FIG. 3 is a flow chart of a controlling method according to an embodiment of the present invention.

FIG. 3 is a flow chart of a controlling method according to an embodiment of the present invention. The controlling method of the embodiment of the present invention can be applied to the moving device 100 shown in FIGS. 1 and 2. For example, the method can be performed by the processor 120 of the moving device 100 shown in FIGS. 1 and 2. Please refer to FIGS. 1-3 for the detailed description.

First, in Step S302, the processor 120 captures environmental feature information of the environment 20 by using the image capturing component 110 during the movement process of the moving device 100. The environmental feature information includes a three-dimensional model of the environment 20 where the moving device 100 is located. The three-dimensional model includes the relative locations of the electronic apparatuses (such as the electronic apparatuses 22 and 24), the door(s), the window(s), and the room(s) in the environment 20 and further includes the map information of the indoor environment. Specifically, the image capturing component 110 can be a lens apparatus with machine vision, such as a camera having a TOF lens disposed above the moving device 100. The processor 120 gradually detects the indoor environment and the depth of the indoor environment and positions the location of the moving device 100 during the movement process based on simultaneous localization and mapping (SLAM) algorithm through the rotation of the lens of the image capturing component 110 to capture the three-dimensional model of the environment 20, thereby constructing a complete indoor structure. The processor 120 further calculates and analyzes the relative locations of the electronic apparatuses, the door(s), the window, and the room(s) to establish map information of the indoor environment and the location where the moving device 100 is currently located. Specifically, in Step S302, the processor 120 may establish the three-dimensional model of the environment 20 based on the SLAM algorithm according to the information which is obtained by detecting the environment 20 and the depth of the environment 20 and positioning the location of the moving device 100. Thus, the processor 120 can recognize how many three-dimensional objects in the environment 20 and their relative positions according to the established three-dimensional model.

Figure 4A:
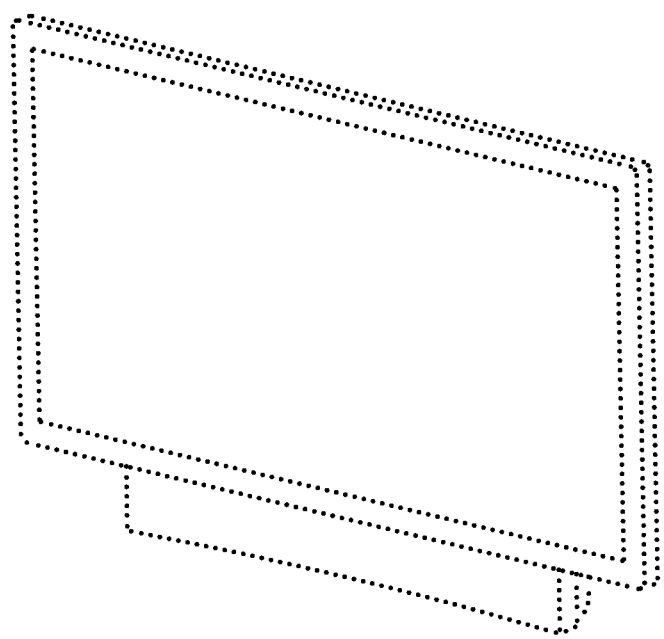
FIG. 4A and FIG. 4B are schematic diagrams showing predetermined shape feature description data of an electronic apparatus according to the embodiment of the present invention.
Figure 4B:
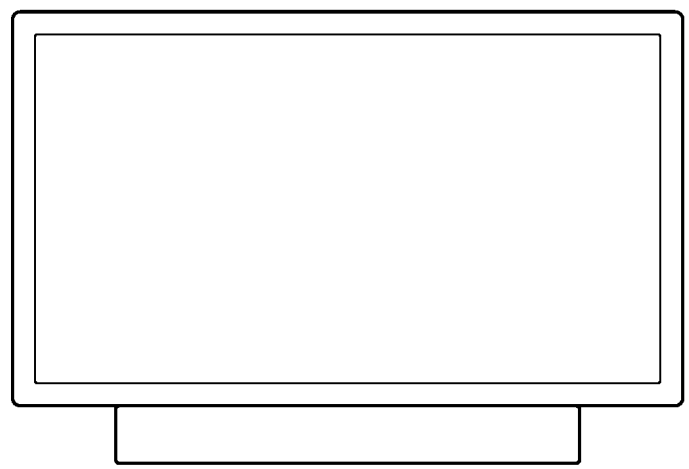

After capturing the environmental feature information including the three-dimensional model of the environment 20, as shown in Step S304, the processor 120 identifies a first location of the first electronic apparatus in the environment according to the environmental feature information and predetermined feature information corresponding to the first electronic apparatus. The predetermined feature information includes shape feature description data of the first electronic apparatus, such as a length-width ratio of the first electronic apparatus or other appearance features. In some embodiments, the step of the processor 120 identifying the first location of the first electronic apparatus in the environment may comprise: generating a three-dimensional model corresponding to the environment according to the environmental feature information, wherein the three-dimensional model includes a plurality records of shape feature description data and comparing the shape feature description data of the first electronic apparatus with the shape feature description data of the three-dimensional model to determine the first location. For example, the first electronic apparatus can be a television, and the processor 120 can generate a three-dimensional model corresponding to the environment according to the environmental feature information, wherein the three-dimensional model includes shape feature description data of a plurality of three-dimensional objects. Then, the processor 120 obtains the pre-stored predetermined shape feature description data from the storage device 130 and compares it with the shape feature description data of the three-dimensional model, thereby determining whether one three-dimensional object is a designated home appliance. For example, the processor 120 can compare the predetermined shape feature description data of the television with the shape feature description data of the three-dimensional model to identify the first location of the television from the plurality of three-dimensional objects of the three-dimensional model and record the first location corresponding to the television in the storage device 130. In an embodiment, the predetermined shape feature description data of the first electronic apparatus may be a three-dimensional description data of the first electronic apparatus, as shown in FIG. 4A. In another embodiment, the predetermined shape feature description data may be a two-dimensional description data of the first electronic apparatus, such as a picture, as shown in FIG. 4B. In other words, the processor 120 can perform image an identification operation and a feature comparison operation by using the three-dimensional description data or two-dimensional description data of each electronic apparatus, thereby recognizing the location of each electronic apparatus and recording the corresponding location after the comparison is met.

Then, when the processor 120 receives a remote signal sent by the remote controlling device 200, as shown in Step S306, the processor 120 controls the moving component 150 according to the remote signal to move the moving device 100 to a second location corresponding to the first location. After the moving device 100 moves to the second location, the signal transmitter 160 sends a first signal to the first electronic apparatus from the second location to control the operation of the first electronic apparatus. The second location is determined according to the signal sensing range of the first electronic apparatus. Specifically, when the user wants to remotely control a first home appliance (for example, a television) from a remote end, the user can send a remote signal indicating an operation to be performed on the first electronic apparatus to the moving device 100 located at home through an application installed on the mobile phone. After receiving the remote signal, the moving device 100 analyzes the remote signal to resolve the type of the first electronic apparatus from the remote signal and checks the location information in the storage device 130 to find the corresponding first location and the type of the control signal thereof. Based on the first location, the moving device 100 determines the second location which the first electronic apparatus can receive a transmitted signal from and further determines what control signal will be sent. Then, the moving device 100 controls the moving component 150 to move the moving device 100 to the second location for signal transmitting. After moving to the second location, the moving device 100 sends the corresponding first signal from the second location to the first electronic apparatus through the signal transmitter 160. Accordingly, the moving device 100 can automatically move to a location suitable to the signal transmission according to a control command in the remote signal from the user, so that the user can remotely control the operations of various electronic apparatuses in the environment 20, thereby effectively combining the mobility of the moving device 100 and the remote controlling capabilities of the various electronic apparatuses and establishing a smart environment with the least amount of equipment.

In some embodiments, after transmitting a control signal to the first electronic apparatus, the moving device 100 can capture a first image corresponding to the operation state of the first electronic apparatus by using the image capturing component 110 and transmit the first image to the remote controlling device 200 via the communication module 112. For example, when the processor 120 of the moving device 100 sends a control signal to activate a home appliance, such as a television, the image capturing component 110 can capture the current static or dynamic image of the television after the control signal was sent for a period time. The processor 120 then transmits the image to the remote controlling device 200. The user of the remote controlling device 200 can recognize whether the television has been activated successfully according to the screen on the transmitted image (for example, whether the screen of the television shown on the image is a black screen). The case where the screen on the transmitted image is not a black screen indicates that the television has been activated successfully, and the user of the remote controlling device 200 may request the moving device 100 to send other control signals. The case where the screen on the transmitted image is a black screen indicates that the activation fails, and the user of the remote controlling device 200 may request the moving device 100 to send a control signal again.

In some embodiments, when there is a new second electronic apparatus or a second electronic apparatus whose location in the environment 20 is unknown, the user can also send a message to manually specify the location of the second electronic apparatus. The processor 120 of the moving device 100 receives the message to obtain a third location of the second electronic apparatus in the environment and recognizes where to send signals. Then the processor 120 controls the moving component 150 according to a remote signal corresponding to the second electronic apparatus to control the moving device 100 to move to a fourth location corresponding to the third location and sends a second signal from the fourth location to the second electronic apparatus by the signal transmitter 160 to control the operation of the second electronic apparatus.

In some embodiments, the moving device 100 further includes a cleaning module 170 for performing a cleaning task, such as vacuuming or mopping. The present invention does not limit the internal structure of the cleaning module 170. Any device required for cleaning by the moving device 100 may be provided in the cleaning module 170. For example, the cleaning module 170 comprises a dust box, a fan, and a cleaning brush, but the invention is not limited thereto. In a possible embodiment, the processor 120 controls the cleaning module 170, so that the moving device 100 performs a cleaning operation on the environment 20.

In some embodiments, the moving device 100 may further comprise an environment detection component 180 for detecting the state of the environment 20. The processor 120 can determine whether the environment is in an abnormal state according to the detection result and send a warning signal including the information about the environmental abnormality when detecting that the environment is in the abnormal state. The warning signal can be sent to the pre-designated remote controlling device 200. For example, the environment detection component 180 can be a smoke sensor for detecting whether there is smoke or excessive carbon monoxide production in the environment, but the invention is not limited thereto. The environmental detection component 180 can also be other devices that can detect a dangerous situation in the environment. When the environment detection component 180 detects that an abnormality occurs in the environment 20, the processor 120 sends a warning signal including information about the environmental abnormality to the remote controlling device 200. For example, when the environment detection component 180 detects that there is smoke and/or excessive carbon monoxide generation in the environment, the environment detection component 180 generates an abnormality detection result indicating that smoke and/or excessive carbon monoxide is produced, and the processor 120 generates the warning signal "abnormal-smoke and/or carbon monoxide exceeded" including information about the environmental abnormality and sends it to the pre-designated remote controlling device 200, such as the server of the remote security center or the mobile phone of the homeowner. After receiving the warning signal, the remote controlling device 200 can determine what abnormal situation is according to the information of the environmental abnormality included in the warning signal and determine whether it is necessary to immediately performed related processes for the abnormal situation or continuously track the subsequent state change, so that the related treatment can be quickly performed to eliminate the abnormal situation.

In some embodiments, for an electronic apparatus that is placed at higher locations (such as, an air conditioner disposed on a wall), as the moving device 100 usually moves on a lower plane, even though the moving device 100 moves to the vicinity of the location of the electronic apparatus, the moving device 100 may not be able to enter the range in which the electronic apparatuses can receive signals and cannot successfully control the operation of the electronic apparatus due to the height difference. Therefore, in order to solve the above problem, the moving device 100 can further provide an extension auxiliary bracket to carry the signal transmitter 160, wherein the signal transmitter 160 is disposed on the extension auxiliary bracket. The extension auxiliary bracket can cause the signal transmitter 160 to rise from a first height to a second height and, at the second height, to send the first signal to the first electronic apparatus. The processor 120 can determine whether it is necessary to pull up the extension auxiliary bracket. When determining that the signal quality is not good, the processor 120 controls the extension auxiliary support to by a predetermined height, so that the signal transmitter 160 can enter the effective range in which the first electronic apparatuses can receive signals successfully sends a control signal to remotely control the first electronic apparatus.

Figure 5A:
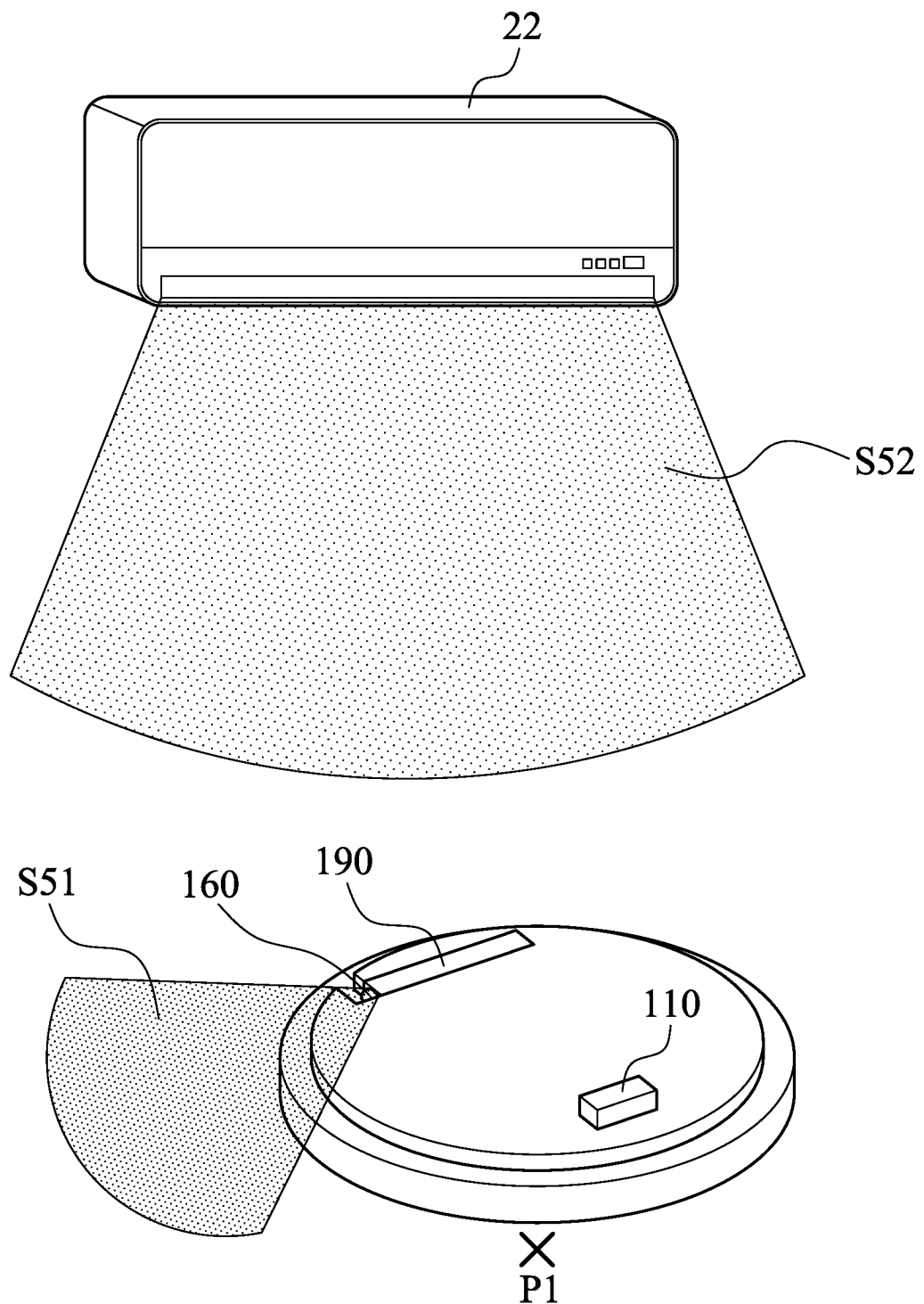
FIGS. 5A and 5B are schematic diagrams showing an operation of an extension auxiliary bracket according to the embodiment of the present invention.
Figure 5B:
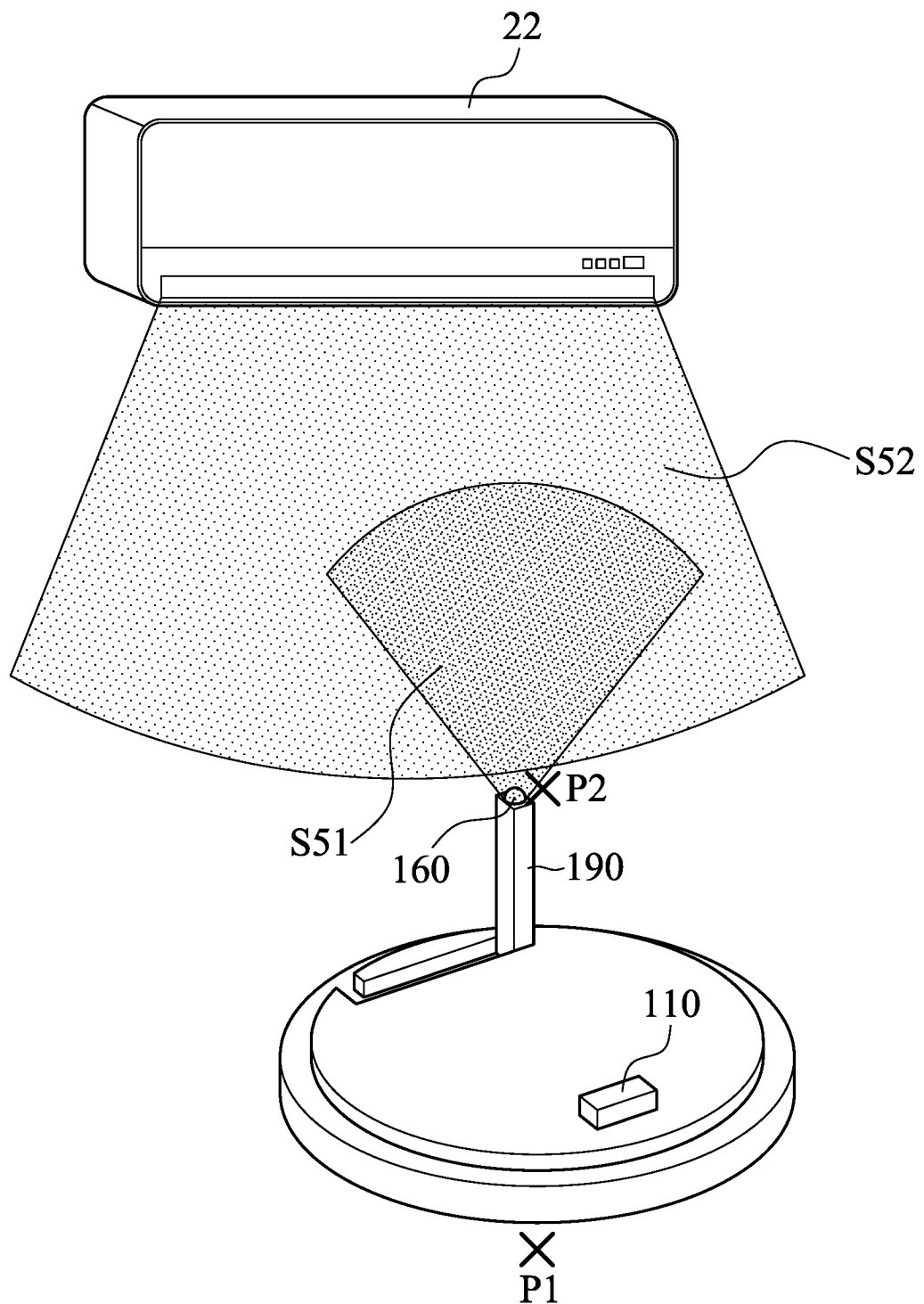

FIGS. 5A and 5B are schematic bracket showing the operation of the extension auxiliary bracket according to an embodiment of the present invention, wherein the moving device 100 comprises an extension auxiliary bracket 190, and the signal transmitter 160 is disposed on top of the extension auxiliary bracket 190. As shown in FIG. 5A, when the moving device 100 moves to the location P1, the extension auxiliary bracket 190 is not pulled up at this time, and the signal-transmission range S51 of the signal transmitter 160 cannot enter the signal-receiving range S52 of the electronic apparatus 22. As shown in FIG. 5B, when the extension auxiliary bracket 190 is pulled up, the signal transmitter 160 rises from a first height (for example, 0 degrees) to a second height (for example, 90 degrees) and, at the second height (P2), sends the first signal to the electronic apparatus 22. Since the signal-transmission range S51 of the signal transmitter 160 has entered the signal-receiving range S52 of the electronic apparatus 22, the control signal can be successfully sent to remotely controlling electronic apparatus 22.

In some embodiments, the moving device 100 can also utilize the image capturing component 110 to assist in home security detection and determination to detect whether a stranger invades. In an embodiment, a plurality of predetermined facial images (for example, facial images of related persons in the environment 20) may be stored in the storage device 130 in advance, and the user may activate the home security detection and determination function of the moving device 100 in a set time period, such as working hours or going out. After the home security detection and determination function of the moving device 100 is activated, the processor 120 continuously monitors the environment 20 through the image capturing component 110. When a facial image to be verified is obtained, the processor 120 compares the facial image to be verified with all the stored predetermined facial images to determine whether the facial image to be verified is from a stranger. The case where the facial image to be verified is not one of the predetermined facial images indicates that the external environment may be invaded by a stranger, and, at this time, the processor 120 sends a signal which indicates that the environment 20 has been invaded to the remote controlling device 200. In another embodiment, the processor 120 can also actively communicate with the police department to ask to send a commissioner to deal with the situation.

In another embodiment, the environment 20 further comprises an environmental object (such as, a gate or a window) disposed at a fixed location, and the processor 120 provides first image feature information and second image feature of the environmental object information. The processor 120 obtains current image feature information by the image capturing component 110 and determines the state of the environmental object according to the first image feature information, the second image feature information, and the current image feature information. When determining that the state of the environment object changes, the processor 120 sends a warning signal to the remote controlling device 200. The first image feature information corresponds to a first state of the environment object, and the second image feature information corresponds to a second state of the environment object. For example, the environment object may be an object to be monitored in the environment 20, such as a window. In this case, the first image feature information may be an image or feature data indicating the first state when the window is closed, and the second image feature information may be an image or feature data indicating the second state when the window is not closed. After the user activates the home security detection and determination function of the moving device 100 in a set time period, such as working hours or going out, since the location of the environment object, such as the window, can be recognized from the established three-dimensional model, the moving device 100 can move to a suitable location. The processor 120 can continuously monitor and capture the current image of the window by the image capturing component 110 and compare the first image feature information, the second image feature information, and the current image feature information to determine whether the window is opened. When the processor 120 determines that the state of the environmental object changes (from closed to opened), a warning signal is sent to the remote controlling device 200.

Therefore, according to the moving device, the controlling method thereof, and the remote controlling system of the present invention, a three-dimensional model of an indoor environment can be established by using image capturing and machine vision capability of the moving device in the indoor environment, the locations of electronic apparatuses that can be remotely controlled in the environment, such as smart home appliances, can be automatically detected or manually set, and the corresponding control signals can be sent to remotely control the electronic apparatuses that need to be activated, thereby effectively combining the mobility of the moving device and the remote controlling capabilities of the smart home appliances and establishing a smart home environment with the least amount of equipment. In addition, according to the moving device, the controlling method thereof, and the remote controlling system of the present invention, various environmental monitoring and abnormal warning functions are provided, and the moving device is used to assist in detecting the environment and send a warning signal when an abnormality in the environment occurs or a stranger invades, thereby effectively achieving the purpose of home security protection.

The method of the invention, or a particular version or portion thereof, may exist in the form of codes. The codes may be included in a physical medium, such as a floppy disk, a CD, a hard disk, or any other machine readable (such as computer readable) storage medium, or a computer program product which is not limited to a particular external form. When the codes are loaded and executed by a machine, such as a computer, the machine becomes a device which participates in the present invention. The codes can also be transmitted over some transmission medium, such as a wire or cable, fiber optic, or a media with any transmission type. When the invention is implemented in a general-purpose processing unit, the code combination processing unit provides an operation similar to a unique device applying application specific logics.

In addition, various illustrative logic blocks, modules, and circuits, and the various aspects disclosed herein may be applied in an integrated circuit (IC), an access terminal, or an access point, or performed by an integrated circuit (IC), an access terminal, or an access point. The integrated circuit can be a general-purpose processor, a digital signal processor (DSP), an application specific integrated circuit (ASIC), a field programmable gate array (FPGA) or any other programmable logic device, discrete gates or transistor logics, discrete hardware components, electronic components, optical components, mechanical components, or any combination of the above to perform the functions described herein and may execute codes or instructions that exist in the integrated circuit, outside the integrated circuit, or both. A general-purpose processor may be a microprocessor, but could be any conventional processor, controller, microcontroller, or state machine. The processor may be composed of a combination of computer devices, such as a combination of a digital signal processor and a microcomputer, a plurality of microcomputers, a combination of one or more microcomputers and a digital signal processor core, or any other similar configuration.

The use of ordinal numbers such as "first" and "second" in the context of the claims does not imply any priority, prioritization, prioritization between the elements, or prioritization of the steps performed by the method. The ordinal numbers are only used as an identifier to distinguish between different elements with the same name (with different ordinal numbers).

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A moving device moving autonomously in an environment where at least one electronic apparatus is located, comprising:
    an image capturing component capturing environmental feature information of the environment during moving process of the moving device;
    a processor, electrically connected to the image capturing component, identifying a first location of the at least one electronic apparatus in the environment according to the environmental feature information and predetermined feature information corresponding to the at least one electronic apparatus;
    a storage device, coupled to the processor, wherein the processor stores the first location in the storage device, and in response to receiving a remote signal, the processor finds the first location from the storage device according to the remote signal and determines a second location corresponding to the first location according to a signal sensing range of the at least one first electronic apparatus;
    a moving component controlled by the processor and causing the moving device to move to the second location; and
    a signal transmitter controlled by the processor and sending a first signal from the second location to the at least one electronic apparatus to control the operation of the at least one electronic apparatus.

2. The moving device as claimed in claim 1, wherein the predetermined feature information comprises shape feature description data of the at least one electronic apparatus, the processor generates a three-dimensional model of the environment according to the environmental feature information and the three-dimensional model comprises a plurality of records of shape feature description data, and the processor compares the shape feature description data with the environmental feature information to determine the first location.

3. The moving device as claimed in claim 1, further comprising:
    an environment detection component controlled by the processor to detect the environment, wherein when the environment detection component detects that the environment is in an abnormal state, the processor sends a warning signal comprising information about environmental abnormality to a remote controlling device.

4. The moving device as claimed in claim 1, wherein the processor obtains a first image corresponding to an operation state of the at least one electronic apparatus through the image capturing component and transmits the first image to a remote controlling device.

5. The moving device as claimed in claim 1, wherein the at least one electronic apparatus is at least one home appliance.

6. The moving device as claimed in claim 1, further comprising:
    a cleaning component controlled by the processor and performing a cleaning operation on the environment.

7. The moving device as claimed in claim 1,
    wherein the storage device stores a plurality of predetermined facial images,
    wherein the processor obtains a facial image to be verified through the image capturing component, compares the facial image to be verified with the plurality of predetermined facial images, and
    wherein when the facial image to be verified is not one of the predetermined facial images, the processor sends a warning signal which indicates that the environment has been invaded to a remote controlling device.

8. A controlling method for controlling the moving device as claimed in claim 1.

9. A computer-readable storage media comprising a stored computer program, wherein the controlling method as claimed in claim 8 is performed when an apparatus executes the stored computer program.

10. The moving device as claimed in claim 1, further comprising:
    an extension auxiliary bracket controlled by the processor and carrying the signal transmitter, wherein the signal transmitter is disposed on the extension auxiliary bracket, and the extension auxiliary bracket is used to cause the signal transmitter to rise from a first height to a second height and, at the second height, to send the first signal to the at least one electronic apparatus.

11. A remote controlling system performing a remote controlling operation in an environment, comprising:
    a first electronic apparatus disposed in a first location in the environment;
    the moving device as claimed in claim 1, autonomously moving in the environment; and
    a remote controlling device, coupled to the moving device via a network, generating the remote signal corresponding to the first electronic apparatus, and transmitting the remote signal to the moving device via the network.

* * * * *